United States Patent [19]

Nakai et al.

[11] Patent Number: 5,311,105
[45] Date of Patent: May 10, 1994

[54] BRUSHLESS MOTOR OPERATING METHOD AND APPARATUS

[75] Inventors: Mitsuhisa Nakai; Shiro Maeda; Toshiaki Yagi, all of Kusatsu, Japan

[73] Assignee: Matsushita Electric Industrial Co. Ltd., Osaka, Japan

[21] Appl. No.: 60,693

[22] Filed: May 10, 1993

Related U.S. Application Data

[63] Continuation of Ser. No. 768,547, Sep. 30, 1991, abandoned.

[30] Foreign Application Priority Data

Feb. 14, 1990 [JP] Japan .................. 2-034323

[51] Int. Cl.$^5$ ............................................. H02P 7/00
[52] U.S. Cl. ................................ 318/254; 318/439
[58] Field of Search ............ 318/254, 439, 138, 778, 318/779, 721, 799, 805, 807, 806, 459, 461

[56] References Cited

U.S. PATENT DOCUMENTS

| | | | |
|---|---|---|---|
| 4,455,513 | 6/1984 | Fulton et al. | 318/138 |
| 4,641,066 | 2/1987 | Nagata et al. | 318/254 |
| 4,673,849 | 6/1987 | Sears et al. | 318/254 X |
| 4,700,116 | 10/1987 | Inoue et al. | 318/254 |
| 4,743,815 | 5/1988 | Gee et al. | 318/254 |
| 4,835,448 | 5/1989 | Dishner et al. | 318/254 |
| 4,937,508 | 6/1990 | Rozman | 318/254 |
| 4,983,894 | 1/1991 | Oku et al. | 318/138 |

FOREIGN PATENT DOCUMENTS 3012833A 10/1981 European Pat. Off. .
3036908C 4/1982 European Pat. Off. .
59-36520 9/1984 Japan .

OTHER PUBLICATIONS

Kenichi Iizuka, et al "Microcomputer Control for Sensorless Brushless Motor," IEEE Transactions on Industry Applications, vol. 1A-21, No. 4, May/Jun. 1985.

Primary Examiner—Jonathan Wysocki
Attorney, Agent, or Firm—Stevens, Davis, Miller & Mosher

[57] ABSTRACT

In a brushless motor, during a synchronized operation mode, n kinds of driving waveforms having the first to n-th patterns are sequentially outputted and the outputting of the n-th pattern is followed by cyclically outputting the patterns again in a sequence from the first pattern, thereby generating a rotating magnetic field in an armature winding. Upon transition from the synchronized operation mode to a rotor position detection operation mode, the commutation signal is changed over from the synchronizing signal to a signal based on the rotor position detector signal after the (n−1)th pattern has been outputted and at a timing when the n-th pattern is to be subsequently outputted. Thereby, upon transition from the synchronized operation mode to the rotor position detection operation mode, the commutation signals are linked in a proper sequence so that smooth mode transition becomes possible without the addition of any special ancillary circuit.

6 Claims, 4 Drawing Sheets

BRUSHLESS MOTOR OPERATING METHOD AND APPARATUS

This application is a continuation of application Ser. No. 07/768,547, filed Sept. 30, 1991 (abandoned).

TECHNICAL FILED

The present invention relates to a brushless motor, and more particularly to a method and apparatus for operating a brushless motor of a type in which the relative position of a magnet rotor and an armature winding is detected from an induced voltage induced in the armature winding and the brushless motor is operated on the basis of the position detection signal.

BACKGROUND ART

Usually, a brushless motor needs a detector for detecting the position of magnetic poles of a rotor of the motor. However, for example, in the case where it is difficult to use the pole position detector, there is employed a method in which the pole position detector is omitted and a commutation signal of the motor is generated on the basis of a voltage signal induced in an armature winding. This method will now be explained.

FIG. 1 is a diagram showing the construction of the conventional brushless motor operating apparatus. Reference numeral 1 designates a DC power source and numeral 2 designates a semiconductor switching element group which is composed of six transistors U to Z and six diodes connected in inverse parallel with the transistors. Numeral 3 designates a brushless motor which is composed of a three-phase connected armature winding 4 and a magnet rotor 5. Numeral 6 designates rotor position detection means which is composed of three filters 61 to 63 and a group 64 of comparators. Numeral 7 designates commutation signal generation means which performs a logical operation on rotor position detection signals 6U, 6V and 6W as outputs of the rotor position detection means to generate commutation signals 7U to 7Z of the transistors in the semiconductor switching element group 2.

With the above construction, in a rotor position detection operation mode in which a voltage signal induced in the armature winding 4 is detected and the brushless motor 3 is operated by a commutation signal generated on the basis of a rotor position detection signal obtained through conversion of the voltage signal by the rotor position detection means 6, the commutation signal generation means 7 receives rotor position detection signals 6U to 6W as shown in FIG. 2 and performs a logical operation thereon to generate commutation signals 7U to 7Z. The transistors in the semiconductor switching element group 2 are switched by those commutation signals, thereby causing the brushless motor to continuously generate a rotational torque.

On the other hand, during a time when the brushless motor 3 is stopped, no induced voltage is generated. Upon activation, therefore, commutation signals 7U to 7Z as shown in FIG. 2 are applied at a low frequency to forcibly rotate the brushless motor 3 at a low speed. By this rotation, induced voltages are generated in the armature winding 4. The induced voltages are converted by the rotor position detection means 6 to obtain rotor position detection signals 6U to 6W as shown in FIG. 2. The above operation mode is a synchronized operation mode. At the point of time when such rotor position detection signals have been settled in the synchronized operation mode, a signal source for the commutation signals 7U to 7Z is changed over to the rotor position detection signals 6U to 6W, thereby making transition to the rotor position detection operation mode.

In the above construction, there is well known a hard ware for the commutation signal generation means 7 which generates the commutation signals 7U to 7Z from the position detection signals 6U to 6W through the logical operation.

In the case where a microcomputer is used as the commutation signal generation means 7, there can be considered a method in which in the rotor position detection operation mode the microcomputer always monitors the rotor position detection signals 6U to 6W and generates the commutation signals 7U to 7Z in accordance with the (High or Low) levels of the rotor position detection signals. In this method, the monitoring of the levels of the rotor position detection signals is made even in the case where transition from the synchronized operation mode to the rotor position detection operation mode is made. Therefore, smooth transition is possible without specifically taking the timing of transition into consideration.

However, in the above method, the microcomputer must sample frequently the rotor position detection signals. Accordingly, the greater part of the control capacity of the microcomputer is used for the driving of the brushless motor and hence another control or a control for an equipment using the brushless motor is restricted.

Also, if the number of times of sampling is decreased in order to make the other control, an error in phase of the commutation signal is generated.

To solve the above problem in this method, there can be considered a method of taking to consideration the rise and fall edges of the rotor position detection signals. Namely, as shown in FIG. 3, the first to sixth patterns exist as output patterns of the commutation signals 7U to 7Z corresponding to the edge change-over of the rotor position detection signals 6U to 6W and these patterns are outputted in a sequence from the first pattern.

For example, when the rise of the rotor position detection signal 6U is detected at a timing a, commutation signals are outputted with the first pattern. Thereafter, when the edge of the rotor position detection signal 6W is detected at a timing b, the pattern of commutation signals is changed over to the second pattern. Subsequently, the edge of 6V, the rise of 6U, the edge of 6W and the edge of 6V occur at timings c, d, e and f, respectively, and the third to sixth patterns are sequentially outputted as the patterns of commutation signals, respectively. After the outputting of the sixth pattern, the first pattern is outputted again at the rise of 6U and the similar operation is repeated. In this method, it suffices that the microcomputer handles only the edges of the rotor position detection signals as interruption signals. The microcomputer can make another control during the other time. Therefore, the utility efficiency of the microcomputer is greatly improved.

In the above method, however, since the edges of the rotor position detection signals 6U to 6W and the sequence of the commutation signals 7U to 7Z are uniquely determined, the smooth driving of the motor is not possible unless the output sequence of the first to sixth patterns is strictly kept. Especially, there is a problem that if the rotor position detection signals and the commutation signals are linked in a proper sequence at a timing of transition from the synchronized operation mode to the rotor position detection operation mode, smooth transition is impossible.

DISCLOSURE OF INVENTION

Therefore, in the present invention, during the synchronized operation mode, n kinds of driving waveforms having the first to n-th patterns are sequentially outputted and the outputting of the n-th pattern is followed by cyclically outputting the patterns again in a sequence from the first pattern, thereby generating a rotating magnetic field in an armature winding. Upon transition from the synchronized operation mode to the rotor position detection operation mode, a signal source for generation of the commutation signal is changed over from the external signal to the rotor position detection signal after the (n−1)th pattern has been outputted and at a timing when the n-th pattern is to be subsequently outputted.

Also, in the present invention, upon transition from the synchronized operation mode to the rotor position detection operation mode, a pattern of the rotor position detection signal corresponding to a pattern thereof at the time of outputting of the n-th pattern of the driving waveforms is compared with a specified pattern and the signal source for generation of the commutation signal is changed over from the external signal to the rotor position detection signal immediately after both the patterns have coincided with each other.

Further, the present invention is provided with a brushless motor having a plural-phase armature winding connected in a neutral ungrounded fashion and a magnet rotor, a DC power source, a group of semiconductor switching elements for passing/interrupting a current to the armature winding, position detection means for detecting the relative position of the armature winding and the magnet rotor in accordance with a voltage signal induced in the armature winding, and commutation signal generation means for outputting a synchronizing signal in the synchronized operation mode and generating a commutation signal on the basis of an output of the position detection means in the rotor position detection operation mode, in which in the synchronized operation mode, n kinds of driving waveforms having the first to n-th patterns are sequentially outputted with the outputting of the n-th pattern being followed by cyclically outputting the patterns again in a sequence from the first pattern, thereby generating a rotating magnetic field in the armature winding, and upon transition from the synchronized operation mode to the rotor position detection operation mode, the commutation signal is changed over from the synchronizing signal to a signal based on the rotor position detection signal after the (n−1)th pattern has been outputted and at a timing when the n-th pattern is to be subsequently outputted.

Furthermore, the present invention is provided with pattern comparison means for comparing a pattern of the rotor position detection signal with a specified pattern, in which upon transition from the synchronized operation mode to the rotor position detection operation mode, a pattern of the rotor position detection signal corresponding to a pattern thereof at the time of outputting of the n-th pattern of the driving waveforms is compared with the specified pattern and the commutation signal is changed over from the synchronizing signal to a signal based on the rotor position detection signal immediately after both the patterns have coincided with each other.

Upon transition from the synchronized operation mode to the rotor position detection operation mode, the commutation signals are linked in a proper sequence, thereby making smooth mode transition possible.

BEST MODE FOR CARRYING OUT THE INVENTION

A first embodiment will now be described in reference to the drawings.

Figure 1:
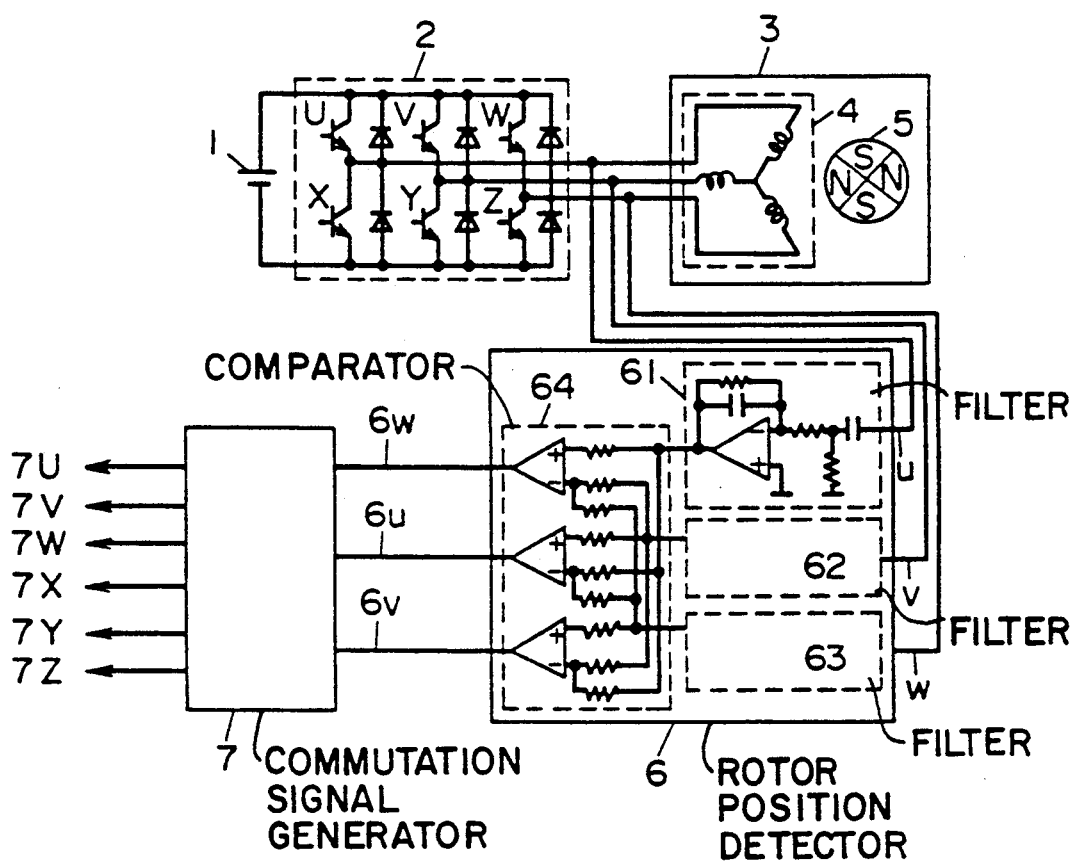
FIG. 1 is a diagram showing the construction of the conventional apparatus and a first embodiment of the present invention.
Figure 2:
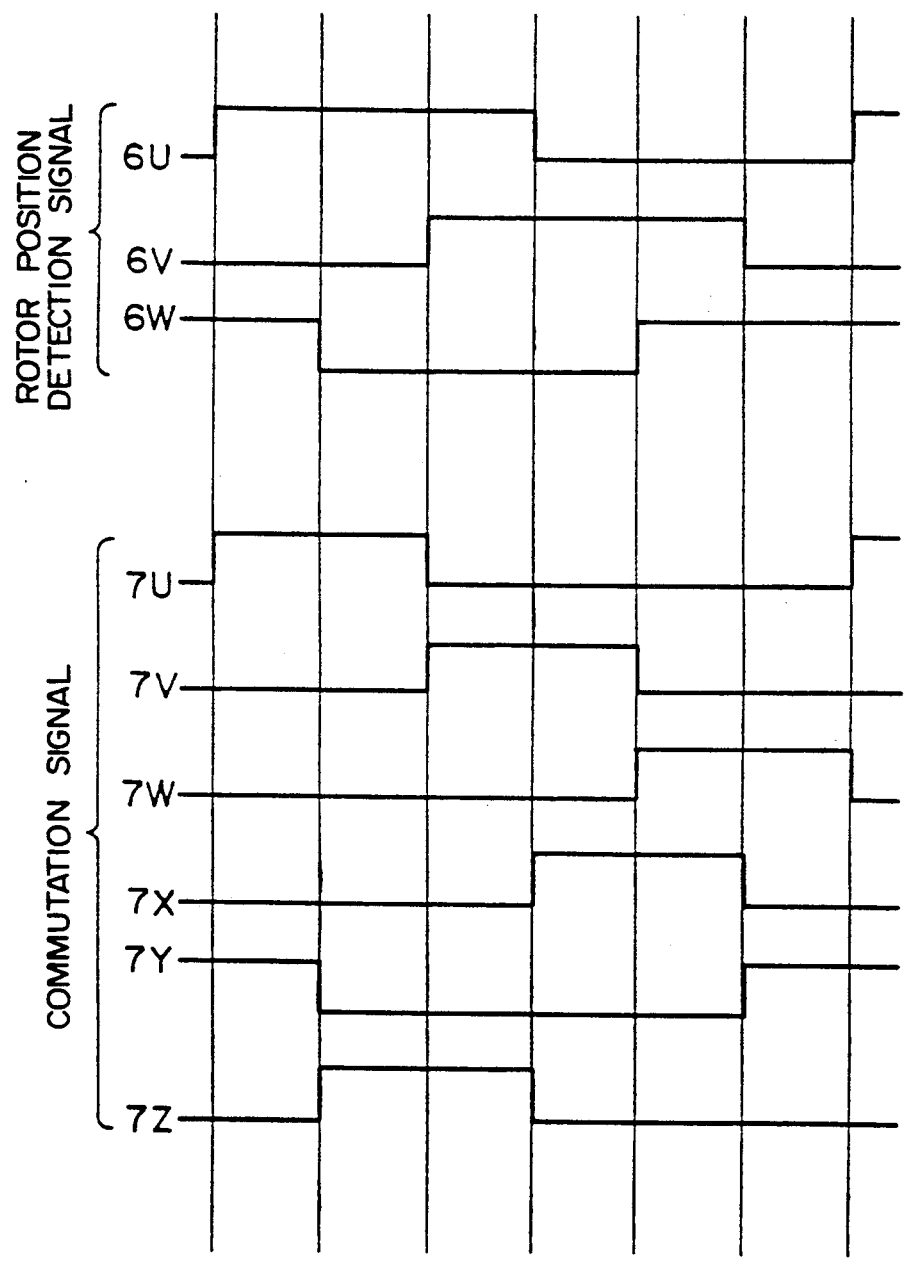
FIG. 2 is a timing chart of rotor position detection signals and commutation signals in the conventional apparatus.

FIG. 1 is a diagram showing the construction of a brushless motor operating apparatus in the first embodiment of the present invention which has a construction similar to the construction of the conventional apparatus. In the figure, reference numeral 1 designates a DC power source and numeral 2 designates a semiconductor switching element group which is composed of six transistors U to Z and six diodes connected in inverse parallel with the transistors. Numeral 3 designates a brushless motor which is composed of a three-phase connected armature winding 4 and a magnet rotor 5. Numeral 6 designates rotor position detection means which is composed of three filters 61 to 63 and a group 64 of comparators. Numeral 7 designates a microcomputer as commutation signal generation means which performs a logical operation on rotor position detection signals 6U, 6V and 6W outputted from the rotor position detection means 6 to generate commutation signals 7U to 7Z of the transistors in the semiconductor switching element group 2, thereby switching the transistors U to Z, respectively.

The operation of the brushless motor operating apparatus having the above construction will be described.

Figure 3:
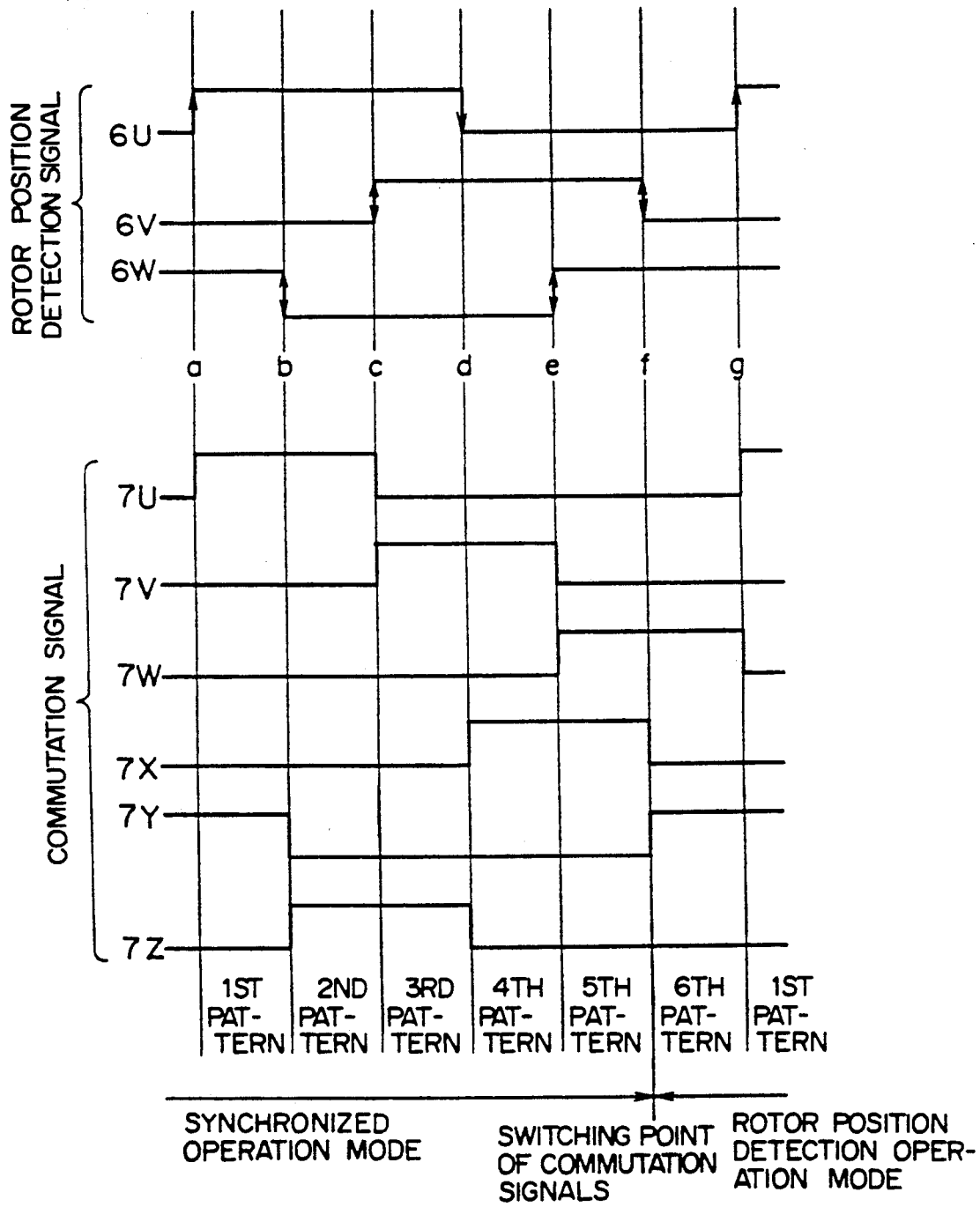
FIG. 3 is a timing chart of rotor position detection signals, commutation signals operation modes in the present invention.

Firstly, upon activation of the brushless motor, low frequency commutation signals 7U to 7Z as shown in FIG. 3 are outputted from the microcomputer 7 to forcibly rotate the brushless motor 3. At the point of time when an induced voltage has been generated in the armature winding 4 by this rotation so that sufficient rotor position detection signals are settled, transition is made from a synchronized operation mode to a rotor position detection operation mode. At the time of this transition, the rotor position detection signals 6U to 6W are taken in with the synchronized operation mode being terminated after the commutation signals outputted in a sequence from the first pattern have taken the fifth pattern and at a timing when the sixth pattern is to be subsequently outputted. At this moment, the rotor position detection signals 6U to 6W take a pattern (6U, 6V, 6W)=(L, L, H) corresponding to a pattern at the time of outputting of the commutation signals having the sixth pattern. Accordingly, at a timing when 6U rises next as the brushless motor rotates, the commutation signals 7U to 7Z will take the first pattern. Subsequently, the commutation signals are sequentially generated on the basis of the rotor position detection signals. Namely, the brushless motor is operated in the rotor position detection mode.

Next, a second embodiment of the present invention will be described in reference to the drawings.

Figure 4:
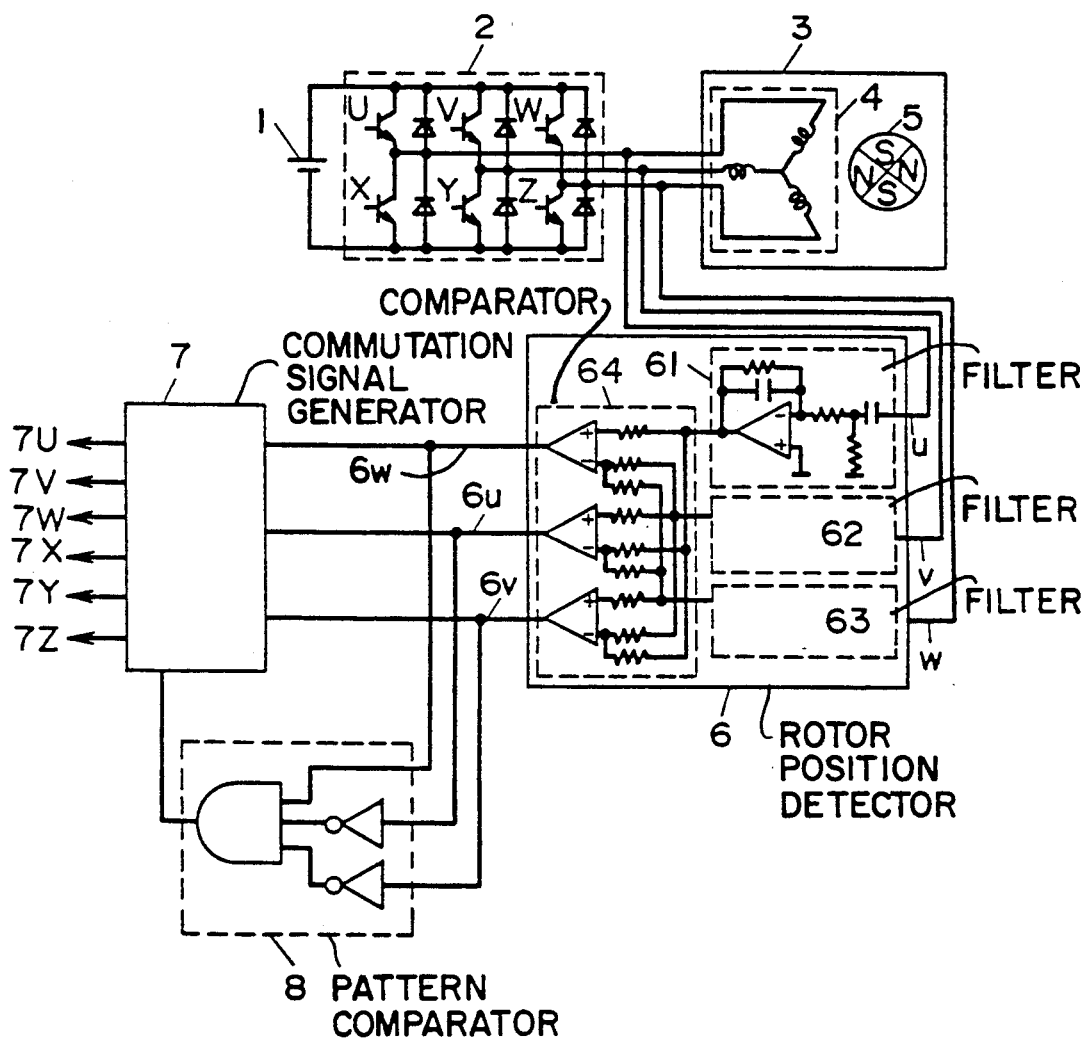
FIG. 4 is a diagram showing the construction of a brushless motor operating apparatus in a second embodiment of the present invention.

FIG. 4 is a diagram showing the construction of a brushless motor operating apparatus according to the second embodiment of the present invention. Reference numerals 1 to 7 designate components similar to those in the first embodiment. Therefore, explanation thereof will be omitted. Numeral 8 designates pattern comparison means which compares the rotor position detection signals 6U to 6W with a specified pattern (L, L, H) and provides an output to the microcomputer 7 when (6U, 6V, 6W)=(L, L, H) is decided.

The operation of the brushless motor operating apparatus having the above construction will be described.

The brushless motor 3 is activated in a manner similar to that in the first embodiment. At the point of time when sufficient rotor position detection signals have been settled, the microcomputer 7 waits for the reception of an output of the pattern comparison means 8. Soon after the fifth pattern of commutation signals as a synchronizing signal is outputted, the rotor position detection signals take a pattern (6U, 6V, 6W)=(L, L, H) corresponding to a pattern at the time of outputting of the sixth pattern of commutation signals. At this moment, the pattern comparison means 8 provides an output to the microcomputer 7 which in turn makes a change-over from a synchronized operation mode to a rotor position detection operation mode. Thereafter, at a timing when 6U rises next as the brushless motor rotates, the commutation signals 7U to 7Z will take the first pattern. Subsequently, the commutation signals are sequentially generated on the basis of the rotor position detection signals. Namely, the brushless motor is operated in the rotor position detection operation mode.

In the above embodiments, the brushless motor having the three-phase armature winding is used and the six patterns of driving waveforms are used. However, the present invention is not restricted to such conditions.

INDUSTRIAL APPLICABILITY

As has been mentioned above, the present invention is provided with a brushless motor having a plural-phase armature winding connected in a neutral ungrounded fashion and a magnet rotor, a DC power source, a group of semiconductor switching elements for passing/interrupting a current to the armature winding, position detection means for detecting the relative position of the armature winding and the magnet rotor in accordance with a voltage signal induced in the armature winding, and commutation signal generation means for outputting a synchronizing signal in a synchronized operation mode and generating a commutation signal on the basis of an output of the position detection means in a rotor position detection operation mode, in which in the synchronized operation mode, n kinds of driving waveforms having the first to n-th patterns are sequentially outputted with the outputting of the n-th pattern being followed by cyclically outputting the patterns again in a sequence from the first pattern, thereby generating a rotating magnetic field in the armature winding, and upon transition from the synchronized operation mode to the rotor position detection operation mode, the commutation signal is changed over from the synchronizing signal to a signal based on the rotor position detection signal after the (n−1)th pattern has been outputted and at a timing when the n-th pattern is to be subsequently outputted, whereby upon transition from the synchronized operation mode to the rotor position detection operation mode, the commutation signals are linked in a proper sequence so that smooth mode transition becomes possible with no addition of any special ancillary circuit.

Also, the present invention is provided with pattern comparison means for comparing a pattern of the rotor position detection signal with a specified pattern, in which upon transition from the synchronized operation mode to the rotor position detection operation mode, a pattern of the rotor position detection signal corresponding to a pattern thereof at the time of outputting of the n-th pattern of the driving waveforms is compared with the specified pattern and the commutation signal is changed over from the synchronizing signal to a signal based on the rotor position detection signal immediately after both the patterns have coincided with each other, whereby upon transition from the synchronized operation mode to the rotor position detection mode, the commutation signals are linked in a proper sequence, thereby making smooth mode transition possible. Especially, in the synchronized operation mode, there may be the case where the phase of the rotor position detection signal slightly deviates from that of the commutation signal. Even in such a case, the timing of the rotor position detection signal is surely seized, thereby making mode transition possible.

We claim:

1. A method of operating a brushless motor which includes a rotor position detection means and which is operable in a rotor position detection operation mode and a synchronized operation mode, said rotor position detection operation mode comprising:
detecting a voltage signal induced in an armature of a brushless motor having a magnet rotor; and
operating said brushless motor in accordance with a commutation signal generated on the basis of a rotor position detection signal obtained through conversion of said voltage signal by said rotor position detection means;

said synchronized operation mode comprising:
forcibly operating said brushless motor by generating a rotating magnetic field in accordance with a commutation signal generated form an external signal source until said rotor position detection signal is settled, wherein said synchronized operation mode includes n kinds of driving waveform patterns and the first to n-th patterns are sequentially outputted with the outputting of the n-th pattern being following by cyclically outputting the patterns again in an identical sequence, thereby generating a rotating magnetic field in an armature winding of said brushless motor, said method comprising:

changing over, upon transition from the synchronized operation mode to the rotor position detection mode, a signal source for generation of said commutation signal from said external signal source to said rotor position detection signal after the (n−1)th pattern has been outputted and at a timing when the n-th pattern is to be subsequently outputted.

2. A method of operating a brushless motor according to claim 1, wherein, upon transition from the synchronized operation mode to the rotor position detection mode, said method further comprises comparing a pattern of said rotor position detection signal at the time of outputting the n-th pattern of said driving waveform patterns with a specified pattern; and wherein said changing over step includes changing over the signal source for generation of said commutation signal from said external signal source to said rotor position detection signal such that transition to the rotor position detection operatio mode occurs immediately after said comparing step determined that said pattern of said rotor position detection signal and said specified pattern coincide with each other.

3. A brushless motor operating apparatus operable in a synchronized operation mode and a rotor position detection operation mode, comprising:

a brushless motor having a plural-phase armature winding connected in a neutral ungrounded fashion and a magnet rotor;

a DC power source;

a group of semiconductor switching elements for passing/interrupting a current to said armature winding;

position detection means for detecting a position of said armature winding and said magnet rotor in accordance with a voltage signal induced in said armature winding; and commutation signal generation means for outputting a synchronizing signal in said synchronized operation mode and generating a commutation signal on a basis of an output of said position detection means in said rotor position detection operation mode, whereby in said synchronized operation mode, said commutation signal generation means sequentially outputs n kinds of driving waveform patterns wherein the outputting of the n-th pattern is followed by cyclically outputting the patterns again in an identical sequence, thereby generating a rotating magnetic field in the armature winding, whereby upon transition from said synchronized operation mode to said rotor position detection operation mode, said commutation signal generation means changes over said commutation signal from said synchronizing signal to a signal based on said rotor position detection signal after the (n−1)th pattern has been outputted and at a timing when the n-th pattern is to be subsequently outputted.

4. A brushless motor operating apparatus according to claim 3, further comprising pattern comparison means for comparing a pattern of said rotor position detection signal, at the time of outputting the n-th pattern of the driving waveforms, with a specified pattern and outputting a signal to said commutation generation means when said rotor position detection signal and said specified patterns are equal, said commutation signal generation means, in response to said signal generated by said pattern comparison means, changing over said commutation signal is changed over said synchronizing signal to a signal based on said rotor position detection signal immediately after said rotor detection signal, at the time of outputting of the n-th pattern and said specified, pattern coincide with each other.

5. A method of operating a brushless motor according to claim 2, wherein said comparing step is performed whenever a logical state of any one of a plurality of driving waveforms which constitute said patterns changes its logical state.

6. A brushless motor operating apparatus according to claim 4, wherein said comparison means performs said comparing operation whenever a logical state of any one of a plurality of driving waveforms which constitute said patterns changes its logical state.

* * * * *